United States Patent
Amano et al.

(10) Patent No.: US 10,581,033 B2
(45) Date of Patent: Mar. 3, 2020

(54) BATTERY PACKAGING MATERIAL

(71) Applicant: DAI NIPPON PRINTING CO., LTD., Tokyo (JP)

(72) Inventors: Makoto Amano, Tokyo (JP); Rikiya Yamashita, Tokyo (JP); Tetsuya Ojiri, Tokyo (JP); Shunsuke Ueda, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 183 days.

(21) Appl. No.: 15/512,344

(22) PCT Filed: Sep. 3, 2015

(86) PCT No.: PCT/JP2015/075075
§ 371 (c)(1),
(2) Date: Mar. 17, 2017

(87) PCT Pub. No.: WO2016/047416
PCT Pub. Date: Mar. 31, 2016

(65) Prior Publication Data
US 2017/0279090 A1 Sep. 28, 2017

(30) Foreign Application Priority Data

Sep. 26, 2014 (JP) ................ 2014-197010
Mar. 26, 2015 (JP) ................ 2015-065225
Mar. 27, 2015 (JP) ................ 2015-066283

(51) Int. Cl.
*H01M 2/02* (2006.01)
*H01M 2/08* (2006.01)
*B41J 3/407* (2006.01)
*B32B 7/12* (2006.01)
*B32B 27/36* (2006.01)
*B32B 27/42* (2006.01)
*B32B 15/09* (2006.01)
*B32B 27/28* (2006.01)
*B32B 15/08* (2006.01)
*B32B 15/085* (2006.01)
(Continued)

(52) U.S. Cl.
CPC ............. *H01M 2/0287* (2013.01); *B32B 7/12* (2013.01); *B32B 15/08* (2013.01); *B32B 15/082* (2013.01); *B32B 15/085* (2013.01); *B32B 15/088* (2013.01); *B32B 15/09* (2013.01); *B32B 15/095* (2013.01); *B32B 15/098* (2013.01); *B32B 15/18* (2013.01); *B32B 15/20* (2013.01); *B32B 27/16* (2013.01); *B32B 27/281* (2013.01); *B32B 27/283* (2013.01); *B32B 27/285* (2013.01); *B32B 27/30* (2013.01); *B32B 27/308* (2013.01); *B32B 27/32* (2013.01); *B32B 27/34* (2013.01); *B32B 27/36* (2013.01); *B32B 27/365* (2013.01); *B32B 27/38* (2013.01); *B32B 27/40* (2013.01); *B32B 27/42* (2013.01); *B41J 3/4073* (2013.01); *H01M 2/028* (2013.01); *H01M 2/0285* (2013.01); *H01M 2/08* (2013.01); *B32B 2250/02* (2013.01); *B32B 2250/03* (2013.01); *B32B 2255/06* (2013.01); *B32B 2255/10* (2013.01); *B32B 2255/20* (2013.01); *B32B 2255/26* (2013.01); *B32B 2270/00* (2013.01); *B32B 2307/31* (2013.01); *B32B 2307/50* (2013.01); *B32B 2307/514* (2013.01); *B32B 2307/732* (2013.01); *B32B 2307/75* (2013.01); *B32B 2439/40* (2013.01); *B32B 2457/10* (2013.01)

(58) Field of Classification Search
CPC .... H01M 2/0287; H01M 2/0285; H01M 2/08; H01M 2/028; B32B 27/16; B32B 27/42; B32B 27/40; B32B 27/38; B32B 27/365; B32B 27/36; B32B 27/34; B32B 27/32; B32B 27/308; B32B 27/30; B32B 27/285; B32B 27/283; B32B 27/281; B32B 15/20; B32B 15/18; B32B 15/098; B32B 15/095; B32B 15/09; B32B 15/088; B32B 15/085; B32B 15/082; B32B 15/08; B32B 7/12; B32B 2307/75; B32B 2307/732; B32B 2307/514; B32B 2307/50; B32B 2307/31; B32B 2270/00; B32B 2255/26; B32B 2255/20; B32B 2255/10; B32B 2255/06; B32B 2250/03; B32B 2250/02; B32B 2457/10; B32B 2439/40; B41J 3/4073
See application file for complete search history.

(56) References Cited

U.S. PATENT DOCUMENTS

2008/0286635 A1   11/2008  Seino et al.
2011/0143104 A1*  6/2011   Koike ............... B32B 7/06
                                              428/195.1
(Continued)

FOREIGN PATENT DOCUMENTS

JP    2008-287971 A    11/2008
JP    2008-297416 A    12/2008
(Continued)

OTHER PUBLICATIONS

Nov. 2, 2015 International Search Report issued in International Patent Application No. PCT/JP2015/075075.

*Primary Examiner* — Muhammad S Siddiquee
(74) *Attorney, Agent, or Firm* — Oliff PLC

(57) ABSTRACT

A battery packaging material has an excellent ink printing characteristic on a base-layer-side surface. This battery packaging material has a laminated body formed by sequentially stacking at least a base layer, a metal layer, and a sealant layer, with the wet tensile strength of the surface of the base layer being 32 mN/m or greater.

20 Claims, 1 Drawing Sheet

(51) Int. Cl.
*B32B 15/088* (2006.01)
*B32B 15/20* (2006.01)
*B32B 27/38* (2006.01)
*B32B 27/30* (2006.01)
*B32B 15/18* (2006.01)
*B32B 27/34* (2006.01)
*B32B 27/32* (2006.01)
*B32B 27/40* (2006.01)
*B32B 15/098* (2006.01)
*B32B 15/082* (2006.01)
*B32B 27/16* (2006.01)
*B32B 15/095* (2006.01)

(56) References Cited

U.S. PATENT DOCUMENTS

| | | | |
|---|---|---|---|
| 2012/0135301 A1 | 5/2012 | Akita et al. | |
| 2014/0242450 A1* | 8/2014 | Oono | B32B 15/088 |
| | | | 429/176 |
| 2015/0247017 A1* | 9/2015 | Suzuki | B32B 27/32 |
| | | | 428/36.5 |
| 2016/0167395 A1* | 6/2016 | Albonetti | B41J 3/4073 |
| | | | 347/102 |

FOREIGN PATENT DOCUMENTS

| | | |
|---|---|---|
| JP | 2010-047665 A | 3/2010 |
| JP | 2012-033324 A | 2/2012 |
| JP | 2012-124068 A | 6/2012 |
| JP | 2015-065159 A | 4/2015 |

* cited by examiner

BATTERY PACKAGING MATERIAL

TECHNICAL FIELD

The present invention relates to a battery packaging material having an excellent ink printing characteristic on a base material layer-side surface.

BACKGROUND ART

Various types of batteries have been developed heretofore, and in every battery, a packaging material is an essential member for sealing battery elements such as an electrode and an electrolyte. Metallic packaging materials have been often used heretofore as battery packages, but in recent years, batteries have been required to be diversified in shape, and desired to be thinner and lighter as performance of electric cars, hybrid electric cars, personal computers, cameras and mobile phones has been enhanced. However, metallic battery packaging materials that have often been heretofore used have the disadvantage that it is difficult to keep up with diversification in shape, and there is a limit on weight reduction.

Thus, a film-shaped laminate with a base material layer, an adhesive layer, a metal layer and a sealant layer laminated in this order has been proposed as a battery packaging material which is easily processed into diversified shapes and is capable of achieving thickness reduction and weight reduction (see, for example, Patent Document 1). The film-shaped battery packaging material is formed in such a manner that a battery element can be sealed by heat-welding the peripheral edge by heat sealing with the sealant layers facing each other.

For various packaging materials formed from a laminate as described above, a method for performing printing on a packaging material in the following manner is generally employed: printing is performed on a surface of a base material layer with an ink to form a bar code, a pattern or letters or the like thereon, and an adhesive and a metal foil are laminated on the printed surface of the base material layer (commonly referred to as reverse printing). However, when such a printed surface exists between a base material layer and a metal layer, adhesion between the base material layer and the metal layer is reduced, so that delamination between layers easily occurs. Particularly, for batteries to which battery packaging materials are applied, high safety is required, and therefore a method for performing printing by reverse printing as described above is avoided in battery packaging materials. Therefore, a method has been commonly employed in which a seal provided with printed characters is attached to a surface of a base material layer when printed characters such as a bar code are formed on a battery packaging material.

However, when a seal provided with printed characters is attached to a surface of a base material layer, the thickness and the weight of the battery packaging material increase. Thus, in view of the tendency of further reducing the thickness and the weight of a battery packaging material in recent years, studies have been conducted on a method for performing printing on a battery packaging material by directly printing a surface of a base material layer of a battery packaging material with an ink.

As a method for performing printing on a battery packaging material by directly printing a surface of a base material layer of a battery packaging material with an ink, pad printing (also referred to as tampo-printing) is known. The pad printing is the following printing method. First, an ink is fed into a recess portion of a flat plate on which a pattern to be printed is provided by etching. Next, a silicon pad is pressed to the flat plate from above the recess portion to transfer the ink to the silicon pad. Next, the ink transferred to a surface of the silicon pad is transferred to a printed object to form printed characters on the printed object. The pad printing has such an advantage that since an ink is transferred to a printed object using an elastic silicon pad, printing is easily performed on a surface of a battery packaging material after molding, so that printing on a battery is possible after a battery element is sealed with the battery packaging material.

The battery packaging material is molded with a mold at the time of enclosing a battery element, and is provided with a space for storing the battery element. During the molding, the battery packaging material is extended, so that cracks and pinholes are easily generated in a metal layer at a flange portion of the mold. As a method for solving this problem, a method is known in which a surface of a base material layer of a battery packaging material is coated with a lubricant, or a lubricant bled out to a surface of a sealant layer is transferred to the surface of the base material layer in a rolled state to improve the slippage of the sealant layer. When such a method is employed, the battery packaging material is easily drawn in the mold during molding, so that cracks and pinholes in the battery packaging material can be suppressed. Particularly, in view of the request of reducing the thickness and the weight of a battery packaging material in recent years, it is desirable to improve the slippage of a battery packaging material by causing a lubricant to exist at a surface of a base material layer of the battery packaging material.

PRIOR ART DOCUMENT

Patent Document

Patent Document 1: Japanese Patent Laid-open Publication No, 2008-287971

SUMMARY OF THE INVENTION

Problems to be Solved by the Invention

Studies conducted by the present inventors have revealed that when a lubricant is caused to exist at a surface of a base material layer to improve the moldability of a battery packaging material, an ink is repelled at the surface of the base material layer, and thus the ink is hardly fixed, so that a missing part where the ink is not deposited may exist. It has been revealed that particularly when printing is performed by pad printing, the printability tends to be insufficient.

Under these circumstances, a main object of the present invention is to provide a battery packaging material having an excellent ink printing characteristic on a base material layer-side surface. Further, another object of the present invention is to provide a method for producing the battery packaging material, and a battery including the battery packaging material.

Means for Solving the Problems

The present inventors have extensively conducted studies for achieving the above-mentioned object. Resultantly, the present inventors have found that when in a battery packaging material includes a laminate in which at least a base material layer, a metal layer and a sealant layer are laminated in this order, the wet tension of a surface of the base material layer is set to 32 mN/m or more, the ink printing characteristic on the surface of the base material layer can be effectively improved. Further, the present inventors have found that by subjecting a surface of a base material layer (surface on a side opposite to a metal layer) to a corona treatment, the wet tension of the surface of the base material layer can be set to 32 mN/m or more. A first aspect of the present invention has been completed by further conducting studies based on the above-mentioned findings.

The present inventors have extensively conducted studies for achieving the above-mentioned object. Resultantly, the present inventors have found that when in a battery packaging material includes a laminate in which at least a base material layer, a metal layer and a sealant layer are laminated in this order, the contact angle of the base material layer-side surface (surface on a side opposite to the sealant layer) is set to 80° or less, the ink printing characteristic on the base material layer-side surface can be effectively improved. Further, the present inventors have found that by subjecting, the base material layer-side surface to a corona treatment, the contact angle of the base material layer-side surface can be set to 80° or less. A second aspect of the present invention has been completed by further conducting studies based on the above-mentioned findings.

That is, the present invention (including a first aspect and a second aspect) provides an invention of the aspects described below.

Item 1. A battery packaging material including a laminate including at least a base material layer, a metal layer and a sealant layer laminated in this order, wherein a surface of the base material layer has a wet tension of 32 mN/m or more.

Item 2. The battery packaging material according to item 1, which is used in a state in which printing is performed on at east a part of the surface of the base material layer with an ink.

Item 3. The battery packaging material according to item 1, wherein printing is performed on at least a part of the surface of the base material layer with an ink.

Item 4. The battery packaging material according to any one of items 1 to 3, wherein the surface of the base material layer is subjected to a corona treatment.

Item 5. The battery packaging material according to any one of items 1 to 4, wherein a surface of the sealant layer has a wet tension of 25 mN/m or less.

Item 6. The battery packaging material according to any one of items 1 to 5, wherein a lubricant exists on the surface of the sealant layer.

Item 7. The battery packaging material according to any one of items 1 to 6, wherein an adhesive layer is laminated between the base material layer and the metal layer.

Item 8. The battery packaging material according to any one of items 1 to 7, wherein an adhesive layer is laminated between the metal layer and the sealant layer.

Item 9. The battery packaging material according to any one of items 1 to 8, wherein the metal layer is formed of an aluminum foil.

Item 10. The battery packaging material according to any one of items 1 to 9, wherein a lubricant exists on the surface of the base material layer.

Item 11. A battery including a battery element including at least a positive electrode, a negative electrode and an electrolyte, the battery element being stored in the battery packaging material according to any one of items 1 to 10.

Item 12. A method for producing a battery packaging material, the method including the steps of:

providing a base material layer having a surface wet tension of 32 mN/m or more; and laminating at least a base material layer, a metal layer and a sealant layer obtain a laminate.

Item 13. The method for producing a battery packaging material according to item 12, the method including a step of performing printing on at least a part of a surface of the base material layer with an ink, the surface having a wet tension of 32 mN/m or more.

Item 14. A battery packaging material including a laminate including at least a base material layer, a metal layer and a sealant layer laminated in this order, wherein a base material layer-side surface has a contact angle of 80° or less.

Item 15. The battery packaging material according to item 14, which is used in a state in which printing is performed on at least a part of the base material layer-side surface with an ink.

Item 16. The battery packaging material according to item 14, wherein printing is performed on at least a part of the base material layer-side surface with an ink.

Item 17. The battery packaging material according to any one of items 14 to 16, wherein the base material layer-side surface is subjected to a corona treatment.

Item 18. The battery packaging material according to any one of items 14 to 17, wherein a surface of the sealant layer has a wet tension of 25 mN/m or less.

Item 19. The battery packaging material according to any one of items 14 to 18, wherein a lubricant exists on the surface of the sealant layer.

Item 20. The battery packaging material according to any one of items 14 to 19, wherein a lubricant exists on the base material layer-side surface.

Item 21. A method for producing a battery packaging material, the method including the steps of:

providing a base material layer having a surface contact angle of 80° or less; and laminating at least a base material layer, a metal layer and a sealant layer to obtain a laminate.

Item 22. The method for producing a battery packaging material according to item 21, the method including a step of performing printing on at least a part of a base material layer-side surface with an ink, the base material layer-side surface having a contact angle of 80° or less.

Advantages of the Invention

According to the present invention, there can be provided a battery packaging material having an excellent ink printing characteristic on a base material layer-side surface. Further, according to the present invention, there can be provided a battery including the battery packaging material, and a method for producing the battery packaging material.

EMBODIMENT OF THE INVENTION

A battery packaging material according to a first aspect of the present invention includes a laminate in which at least a base material layer, a metal layer and a sealant layer are laminated in this order, wherein the wet tension of a surface of the base material layer is 32 mN/m or more. A battery packaging material according to a second aspect of the present invention includes a laminate in which at least a base material layer, a metal layer and a sealant layer are laminated in this order, wherein the contact angle of a base material layer-side surface is 80° or less. The battery packaging materials according to the first aspect and the second aspect of the present invention, methods for producing the battery packaging materials, and batteries including the battery packaging materials will be described in detail below.

1. Laminated Structure of Battery Packaging Material

Figure 1:
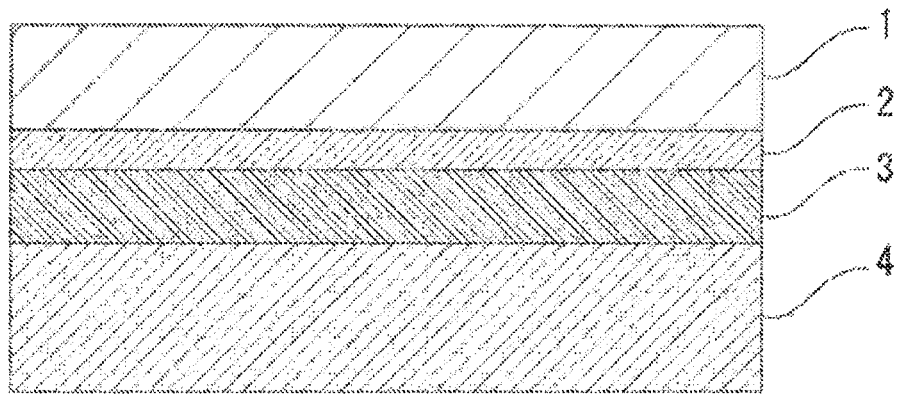
FIG. 1 is a drawing showing one example of a cross-sectional structure of battery packaging materials according to a first aspect and a second aspect of the present invention.

The battery packaging material according to the first aspect of the present invention includes a laminate in which at least a base material layer 1, a metal layer 3 and a sealant layer 4 are laminated in this order as shown in FIG. 1. In the battery packaging material according to the first aspect of the present invention, the base material layer 1 is an outermost layer, and the sealant layer 4 is an innermost layer. That is, at the time of assembling a battery, the sealant layer 4 situated on the periphery of a battery element is heat-welded with itself to hermetically seal the battery element, so that the battery element is encapsulated.

Figure 2:
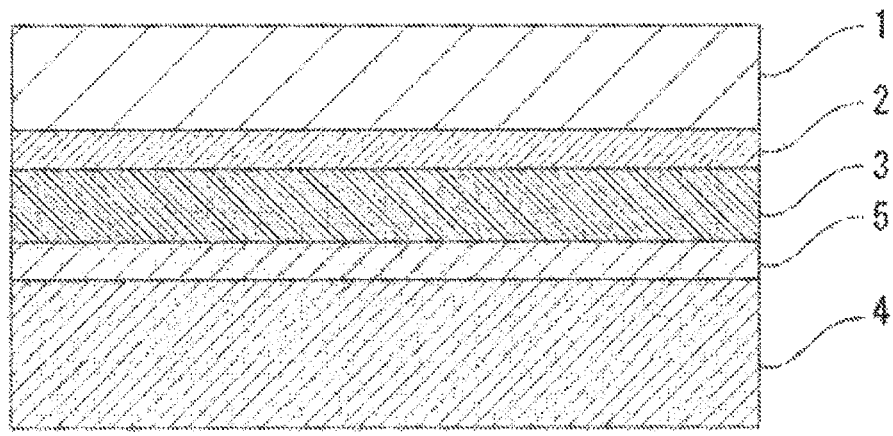
FIG. 2 is a drawing showing one example of a cross-sectional structure of the battery packaging materials according to the first aspect and the second aspect of the present invention.

As shown in FIG. 1, the battery packaging material according to the first aspect of the present invention may be provided with an adhesive layer 2 between the base material layer 1 and the metal layer 3 as necessary in order to improve adhesion of these layers. As shown in FIG. 2, an adhesive layer 5 may be provided between the metal layer 3 and the sealant layer 4 as necessary in order to improve adhesion of these layers.

The battery packaging material according to the second aspect of the present invention includes a laminate in which at least a base material layer 1, a metal layer 3 and a sealant layer 4 are laminated in this order as shown in FIG. 1. In the battery packaging material according to the second aspect of the present invention, the base material layer 1 is an outermost layer (when the battery packaging material eludes a coating layer 6, the coating layer 6 is an outermost layer), and the sealant layer 4 is an innermost layer. That is, at the time of assembling a battery, the sealant layer 4 situated on the periphery of a battery element is heat-welded with itself to hermetically seal the battery element, so that the battery element is encapsulated.

Figure 3:
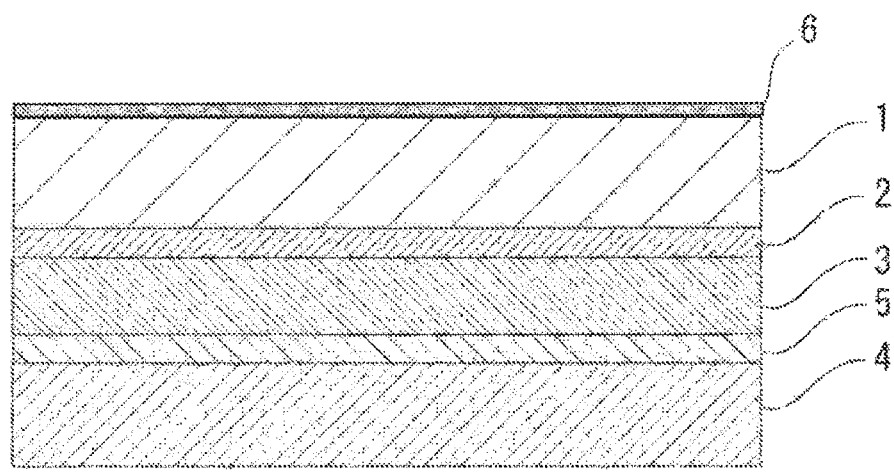
FIG. 3 is a drawing showing one example of a cross-sectional structure of a battery packaging material according to the second aspect of the present invention.

As shown in FIG. 1, the battery packaging material according to the second aspect of the present invention array be provided with an adhesive layer 2 between the base material layer 1 and the metal layer 3 as necessary in order to improve adhesion of these layers. As shown in FIG. 2, an adhesive layer 5 may be provided between the metal layer 3 and the sealant layer 4 as necessary in order to improve adhesion of these layers. Further, as shown in FIG. 3, a surface of the base material layer 1 (surface on a side opposite to the metal layer 3) may be provided with the coating layer 6.

2. Composition of Each Layer Forming Battery Packaging Material

[Base Material Layer 1]

In the battery packaging materials according to the first aspect and the second aspect of the present invention, the base material layer 1 is a layer situated as an outermost layer. The material that forms the base material layer 1 is not particularly limited as long as it has insulation quality. Examples of the material that forms the base material layer 1 include polyesters, polyamides, epoxy resins, acrylic resins, fluororesins, polyurethanes, silicon resins, phenol resins, polyether imides, polyimides, and mixtures and copolymers thereof. It is to be noted that in the second aspect of the present invention, the coating layer 6 is situated as an outermost layer when the battery packaging material includes the coating layer 6 outside the base material layer.

Specific examples of the polyester include polyethylene terephthalate, polybutylene terephthalate, polyethylene naphthalate, polybutylene naphthalate, polyethylene isophthalate, polycarbonate, copolymerization polyesters with ethylene terephthalate as a main repeating unit, and copolymerization polyesters with a butylene terephthalate as a main repeating unit. Specific examples of the copolymerization polyester including ethylene terephthalate as a main repeating unit include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyldicarboxylate) and polyethylene(terephthalate/decane dicarboxylate). Specific examples of the copolymerization polyester with butylene terephthalate as a main repeating unit include copolymer polyesters that are polymerized with butylene isophthalate and include butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyesters may be used alone, or may be used in combination of two or more thereof. A polyester has the advantage that it is excellent in electrolytic solution resistance, so that whitening etc. due to deposition of an electrolytic solution is hard to occur, and thus the polyester is suitably used as a material for formation of the base material layer 1.

Specific examples of the polyamide include aliphatic polyamides such as nylon 6, nylon 66, nylon 610, nylon 12, nylon 46, and copolymers of nylon 6 and nylon 6,6; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polymethaxylylene adipamide (MXD6); cycloaliphatic polyamides such as polyaminomethyl cyclohexyl adipamide (PACM6); polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof. A stretched polyamide film is excellent in stretchability, can prevent occurrence of whitening due to resin breakage in the base material layer 1 during molding, and is thus suitably used as a material for formation of the base material layer 1.

The base material layer 1 may be formed of a uniaxially or biaxially stretched resin film, or may be formed of an unstretched resin film. Among them, a uniaxially or biaxially stretched resin film, particularly a biaxially stretched resin film has improved heat resistance through orientation and crystallization, and is therefore suitably used as the base material layer 1. The base material layer 1 may be formed by coating the top of the metal layer 3 with the above-mentioned material.

Among them, nylons and polyesters are preferred, and biaxially stretched nylons and biaxially stretched polyesters are further preferred, with biaxially stretched nylons being especially preferred, as resin films for formation of the base material layer 1.

The base material layer 1 can also be laminated with at least one of a resin film and a coating which is made of a different material for improving pinhole resistance, and insulation quality as a package of a battery. Specific examples include a multilayer structure in which a polyester film and a nylon film are laminated, and a multilayer structure in which a biaxially stretched polyester and a biaxially stretched nylon are laminated. When the base material layer 1 is made to have a multilayer structure, the resin films may be bonded with the use of an adhesive, or may be directly laminated without the use of an adhesive. Examples of the method for bonding the resin films without the use of an adhesive include methods in which the resin films are bonded in a heat-melted state, such as a co-extrusion method, a sand lamination method and a thermal lamination method. When the resin films are bonded with the use of an adhesive, the adhesive to be used may be a two-liquid curable adhesive, or may be a one-liquid curable adhesive. Further, the adhesion mechanism of the adhesive is not particularly limited, and may be any one of a chemical reaction type, a solvent volatilization type, a heat melting type, a heat pressing type, an electron beam curing type such as that of UV or EB, and so on. Examples of the component of the adhesive include polyester-based resins, polyether-based resins, polyurethane-based resins, epoxy-based resins, phenol resin-based resins, polyimide-based resins, polyolefin-based resins, polyvinyl acetate-based resins, cellulose-based resins, (meth)acryl-based resins, polyimide-based resins, amino resins, rubbers and silicon-based resins.

In the first aspect and the second aspect of the present invention, it is preferable that a lubricant is deposited on the surface of the base material layer 1 for improving the moldability of the battery packaging material. The lubricant is not particularly limited, but it is preferably an amide-based lubricant. Specific examples of the amide-based lubricant include saturated fatty acid amides, unsaturated fatty acid amides, substituted amides, methylol amides, saturated fatty acid his-amides and unsaturated fatty acid bis-amides. Specific examples of the saturated fatty acid amide include lauric acid amides, palmitic acid amides, stearic acid amides, behenic acid amides and hydroxystearic acid amides. Specific examples of the unsaturated fatty acid amide include oleic acid amides and erucic acid amides. Specific examples of the substituted amide include N-oleylpalmitic acid amides, N-stearylstearic acid amides, N-stearyloleic acid amides, N-oleylstearic acid amides and N-stearylerucic acid amides. Specific examples of the methylol amide include methylolstearic acid amides. Specific examples of the saturated fatty acid his-amide include methylene-bis-stearic acid amides, ethylene-bis-capric acid amides, ethylene-bis-lauric acid amides, ethylene-his-stearic acid amides, ethylene-bis-hydroxystearic acid amides, ethylene-bis-behenic acid amides, hexamethylene-bis-stearic acid amides, hexamethylene-bis-behenic acid amides, hexamethylene-hydroxystearic acid amides, N,N'-distearyladipic acid amides and N,N'-distearylsebacic acid amides. Specific examples of the unsaturated fatty acid bis-amide include ethylene-bis-oleic acid amides, ethylene-bis-erucic acid amides, hexamethylene-bis-oleic acid amides, N,N'-dioleyladipic acid amides and N,N'-dioleylsebacic acid amides. Specific examples of the fatty acid ester amide include stearamide ethyl stearates. Specific examples of the aromatic bis-amide include m-xylylene-bis-stearic acid amides, m-xylylene-bis-hydroxystearic acid amides and N,N'-distearylisophthalic acid amides. The lubricants may be used alone, or may be used in combination of two or more thereof.

In the battery packaging material according to the first aspect of the present invention, the wet tension of the surface of the base material layer 1 is 32 mN/m or more. Since the wet tension of the surface of the base material layer 1 is 32 mN/m or more, an ink is hardly repelled at the surface of the base material layer 1, so that excellent printability is obtained. Particularly, when printing is performed on a battery packaging material, the moldability of which is improved by causing a lubricant to exist at a surface of a base material layer, with an ink by pad printing, the ink may be repelled at the surface of the base material layer 1, leading to occurrence of a printing failure. In the battery packaging material according to the first aspect of the present invention, an ink is hardly repelled even in such a case because the wet tension of the surface of the base material layer 1 is 32 mN/m or more, and thus the battery packaging material according to the first aspect of the present invention is suitable as a battery packaging material with printed characters etc. formed on a surface of a base material layer by pad printing.

In the battery packaging material according to the first aspect of the present invention, the wet tension of the surface of the base material layer 1 is not particularly limited as long as it is 32 mN/m or more, but for improving printability while improving moldability, the wet tension of the surface of the base material layer 1 is preferably 35 mN/m or more, more preferably about 36 to 46 mN/m, further preferably about 38 to 44 mN/m.

In the first aspect of the present invention, the wet tension of the battery packaging material is a value obtained by performing measurement using a method conforming to JIS K6768:1999, and the specific method is as described in examples.

In the battery packaging material according to the first aspect of the present invention, the wet tension of the surface of the base material layer 1 can be suitably set to 32 mN/m or more by, for example, subjecting the surface of the base material layer 1 to a corona treatment. The corona treatment can be performed by irradiating the surface of the base material layer 1 with corona discharge using a commercially available corona surface treatment device. The conditions for the corona treatment are not particularly limited as long as the wet tension of the surface of the base material layer 1 is 32 mN/m or more. For example, by treating the surface of the base material layer 1 at a rate of 10 MT/min with an irradiation power of 1 Kw or more, a wet tension of 32 mN/m or more can be obtained.

The thickness of the base material layer 1 is, for example, about 10 to 50 μm, preferably about 15 to 30 μm.

In the battery packaging material according to the second aspect of the present invention, a contact angle of the base material layer 1-side surface (outermost surface of the battery packaging material) is 80° or less. In the second aspect of the present invention, the contact angle of the surface of the base material layer 1 is 80° or less when the base material layer 1 forms the outermost surface. When the later-described coating layer 6 is provided outside the base material layer 1, the contact angle of the surface of the coating layer 6 is 80° or less. In the second aspect of the present invention, the contact angle of the base material layer 1-side surface of the battery packaging material is 80° or less, and therefore an ink is hardly repelled at the base material layer 1-side surface, so that excellent printability is obtained. Particularly, when printing is performed on a battery packaging material, the moldability of which is improved by causing a lubricant to exist at the base material layer 1-side surface, with an ink by pad printing, the ink may be repelled at the base material layer 1-side surface, leading to occurrence of a printing failure. In the battery packaging material according to the second aspect of the present invention, an ink is hardly repelled even in such a case because the contact angle of the base material layer 1-side surface is 80° or less, and thus the battery packaging material according to the first aspect of the present invention is suitable as a battery packaging material with printed characters etc. formed on a surface of a base material layer by pad printing.

In the battery packaging material according to the second aspect of the present invention, the contact angle of the base material layer 1-side surface is not particularly limited as long as it is 80° or less, but for improving printability, the contact angle of the base material layer 1-side surface is preferably 79° or less, more preferably about 72° or less. The lower limit of the contact angle of the base material layer 1-side surface is not particularly limited, and it is usually about 10°.

In the second aspect of the present invention, the contact angle in the battery packaging material is a value obtained by performing measurement using LSE-A210 manufactured by NiCK Corporation, and the specific method is as described in examples.

In the battery packaging material according to the second aspect of the present invention, the contact angle of the base material layer 1-side surface can be suitably set to 80° or less by, for example, subjecting the base material layer 1-side surface to a corona treatment. The corona treatment can be performed by irradiating the base material layer 1-side surface with corona discharge using a commercially available corona surface treatment device. The conditions for the corona treatment are not particularly limited as long as the contact angle of the base material layer 1-side surface is 80° or less. For example, by treating the base material layer 1-side surface at a rate of 10 MT/min with an irradiation power of 1 Kw or more, a contact angle of 80° or less can be obtained.

In the battery packaging material according to the first aspect of the present invention, printing can be suitably performed on at least a part of the surface of the base material layer 1 with an ink. In the battery packaging material in which printing is performed on the surface of the base material layer 1 with an ink in the first aspect and the second aspect of the present invention, the ink (a cured product and dried product of the ink) deposited on the surface of the base material layer 1 is exposed. The deposited ink can form printed characters such as, for example, a bar code, a pattern or letters. The ink to be used for printing is not particularly limited, and a known ink can be used. For example, a photocurable ink which is cured when irradiated with an ultraviolet ray etc., an inkjet ink that is used in an inkjet printer, or the like can be used.

In the battery packaging material according to the second aspect of the present invention, printing can be suitably performed on at least a part of the base material layer 1-side surface with an ink. In the battery packaging material in which printing is performed on the base material layer 1-side surface with an ink in the second aspect of the present invention, the ink (a cured product and dried product of the ink) deposited on the base material layer 1-side surface is exposed. The deposited ink can form printed characters such as, for example, a bar code, a pattern or letters. The ink to be used for printing is not particularly limited, and a known ink can be used. For example, a photocurable ink which is cured when irradiated with an ultraviolet ray etc., an inkjet ink that is used in an inkjet printer, or the like can be used.

[Adhesive Layer 2]

In the battery packaging material according to the first aspect and the second aspect of the present invention, the adhesive layer 2 is a layer provided as necessary for bonding the base material layer 1 and the metal layer 3.

The adhesive layer 2 is formed from an adhesive capable of bonding the base material layer 1 and the metal layer 3. The adhesive used for forming the adhesive layer 2 may be a two-liquid curable adhesive, or may be a one-liquid curable adhesive. Further, the adhesion mechanism of the adhesive used for forming the adhesive layer 2 is not particularly limited, and may be any one of a chemical reaction type, a solvent volatilization type, a heat melting type, a heat pressing type and so on.

Specific examples of the resin component of the adhesive that can be used for forming the adhesive layer 2 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, acid-modified polyolefins and metal-modified polyolefins; polyvinyl acetate-based resins; cellulose-based adhesives; (meth) acryl-based resins; polyimide-based resins; amino resins such as urea resins and melamine resins; rubbers such as chloroprene rubber, nitrile rubber and styrene-butadiene rubber; silicone-based resins; and ethylene fluoride-propylene copolymers. These adhesive components may be used alone, or may be used in combination of two or more thereof. The combination form of two or more adhesive components is not particularly limited, and examples of the adhesive components include mixed resins of polyamides and acid-modified polyolefins, mixed resins of polyamides and metal-modified polyolefins, mixed resins of polyamides and polyesters, mixed resins of polyesters and acid-modified polyolefins, and mixed resins of polyesters and metal-modified polyolefins. Among them, polyurethane-based two-liquid curable adhesive agents; and polyamides, polyesters or blend resins of these resins and modified polyolefins are preferred because they are excellent in spreadability, durability and a yellowing inhibition action under high-humidity conditions, a thermal degradation inhibition action during heat-sealing, and so on, and effectively suppress occurrence of delamination by inhibiting a reduction in lamination strength between the base material layer 1 and the metal layer 3.

The adhesive layer 2 may be made multilayered with different adhesive agent components. When the adhesive layer 2 is made multilayered with different adhesive agent components, it is preferred that a resin excellent in adhesion with the base material layer 1 be selected as an adhesive agent component to be disposed on the base material layer 1 side, and an adhesive agent component excellent in adhesion with the metal layer 3 be selected as an adhesive agent component to be disposed on the metal layer 3 side for improving the lamination strength between the base material layer 1 and the metal layer 3. When the adhesive layer 2 is made multilayered with different adhesive agent components, specific examples of the preferred adhesive agent component to be disposed on the metal layer 3 side include acid-modified polyolefins, metal-modified polyolefins, mixed resins of polyesters and acid-modified polyolefins, and resins containing a copolymerized polyester.

The thickness of the adhesive layer 2 is, for example, about 2 to 50 μm, preferably about 3 to 25 μm.

[Metal Layer 3]

In the battery packaging material according to the first aspect and the second aspect of the present invention, the metal layer 3 is a layer which is intended to improve the strength of the packaging material, and also functions as a barrier layer for preventing ingress of water vapor, oxygen, light and the like into the battery. Specific examples of the metal that forms the metal layer 3 include metal foils such as those of aluminum, stainless steel and titanium. Among them, aluminum is suitably used. For preventing occurrence of creases and pinholes during production of the packaging material, it is preferred to use soft aluminum, for example annealed aluminum (JIS A8021P-O) or (JIS A8079P-O), for the metal layer 3 in the first aspect and the second aspect of the present invention.

The thickness of the metal layer 3 is, for example, about 10 to 200 μm, preferably about 20 to 100 μm.

Preferably, at least one surface, preferably the sealant layer 4-side surface, further preferably both surfaces, of the metal layer 3 is/are subjected to a chemical conversion treatment for stabilization of bonding, prevention of dissolution and corrosion, and so on. Here, the chemical conversion treatment is a treatment for forming an acid resistance film on the surface of the metal layer 3. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphate compound such as sodium phosphate, potassium phosphate, ammonium phosphate or polyphosphoric acid; and a chromate treatment using an aminated phenol polymer formed of repeating units represented by the following general formulae (1) to (4). In the aminated phenol polymer, the repeating units represented by the following general formulae (1) to (4) may be contained alone, or may be contained in combination of two or more thereof.

[Chemical Formula 1]

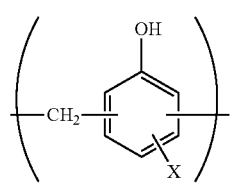

(1)

[Chemical Formula 2]

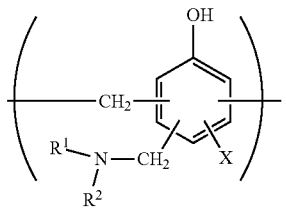

(2)

[Chemical Formula 3]

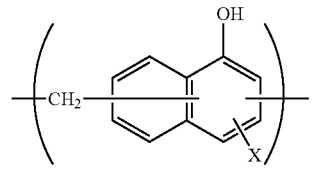

(3)

[Chemical Formula 4]

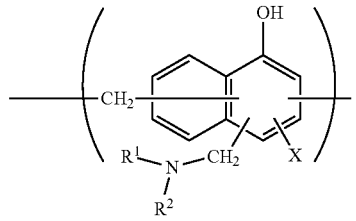

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with 1 to 4 carbon atoms, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups having 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer formed of repeating units represented by the general formulae (1) to (4) is, for example, about 500 to about 1000000, preferably about 1000 to about 20000.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal layer 3. A resin layer with a cationic polymer crosslinked with a crosslinking agent may be formed on the corrosion resistance treatment layer. Here, examples of the cationic polymer include polyethyleneimine, ion polymer complexes composed of a polymer having polyethyleneimine and a carboxylic acid, primary amine-grafted acrylic resins obtained by grafting primary amine to an acryl backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

The chemical conversion treatment may be performed with one chemical conversion treatment alone, or may be performed in combination of two or more chemical conversion treatments. The chemical conversion treatments may be performed using one compound alone, or may be performed using two or more compounds in combination. Among them, a chromic acid chromate treatment is preferred, and a chromate treatment using a chromic acid compound, a phosphate compound and the aminated phenol polymer in combination is further preferred.

The amount of the acid resistance film to be formed on the surface of the metal layer 3 in the chemical conversion treatment is not particularly limited, but for example when a chromate treatment is performed using a chromic acid compound, a phosphate compound and the aminated phenol polymer in combination, it is desirable that the chromic acid compound be contained in an amount of about 0.5 mg to about 50 mg, preferably about 1.0 mg to about 40 mg, in terms of chromium, the phosphate compound be contained in an amount of about 0.5 mg to about 50 mg, preferably about 1.0 mg to about 40 mg, in terms of phosphorus, and the aminated phenol polymer be contained in an amount of about 1 mg to 200 mg, preferably about 5.0 mg to 150 mg, per 1 $m^2$ of the surface of the metal layer 3.

The chemical conversion treatment is performed in the following manner: a solution containing a compound to be used for formation of an acid resistance film is applied to the surface of the metal layer 3 by a bar coating method, a roll coating method, a gravure coating method, an immersion method or the like, and heating is then performed so that the temperature of the metal layer 3 is about 70 to 200° C. The metal layer 3 may be subjected to a degreasing treatment by an alkali immersion method, an electrolytic cleaning method, an acid cleaning method, an electrolytic acid cleaning method or the like before the metal layer 3 is subjected to the chemical conversion treatment. When a degreasing treatment is performed as described above, the chemical conversion treatment of the surface of the metal layer 3 can be further efficiently performed.

[Sealant Layer 4]

In the battery packaging materials according to the first aspect and the second aspect of the present invention, the sealant layer 4 corresponds to the innermost layer, and during assembly of a battery, the sealant layers are heat-welded to each other to hermetically seal the battery element.

The resin component to be used in the sealant layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dimes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, carboxylic acid-modified polyolefins are preferred, and carboxylic acid-modified polypropylene is further preferred.

The sealant layer 4 may be formed from one resin component alone, or may be formed from a blend polymer obtained by combining two or more resin components. Further, the sealant layer 4 may include only one layer, or two or more layers formed of the same resin component or different resin components.

In the battery packaging materials according to the first aspect and the second aspect of the present invention, the sealant layer 4 may contain a lubricant. The type of the lubricant is not particularly limited, and examples thereof include those shown as examples in the section [Base material layer 1]. When the sealant layer 4 contains a lubricant, the content thereof may be appropriately selected, but it is preferably about 700 to 1200 ppm, more preferably about 800 to 1100 ppm. In the first aspect and the second aspect of the present invention, the content of the lubricant in the sealant layer 4 is a total amount of the lubricant existing in the sealant layer 4 and the lubricant existing on the surface of the sealant layer 4.

The thickness of the sealant layer 4 may be appropriately selected, and it is about 10 to 100 μm, preferably about 15 to 50 μm.

In the first aspect and the second aspect of the present invention, preferably, the wet tension of a surface of the sealant layer 4 (battery element-side surface, i.e. surface on a side opposite to the metal layer 3 side) is 25 mN/m or less. Accordingly, an ink deposited on the surface of the base material layer 1 can be effectively inhibited from being transferred to the surface of the sealant layer 4.

The battery packaging materials according to the first aspect and the second aspect of the present invention are generally produced as a belt-shaped laminated film in a production line, and stored and transported as a wound body obtained by winding the laminated film in the form of a roll. During production of a battery, the battery packaging material is unwound from the wound body, cut to a predetermined shape conforming to product specifications for the battery, and used. The cut battery packaging materials may be laminated such that the base material layer 1 and the sealant layer 4 are in contact with each other. In this case, the surface of the base material layer 1 which is situated as an outermost surface of the battery packaging material and the surface of the sealant layer 4 comes into contact with each other, so that an ink deposited on the surface of the base material layer 1 may be transferred to the surface of the sealant layer 4. In the battery packaging materials according to the first aspect and the second aspect of the present invention, the wet tension of the surface of the sealant layer 4 is set to 25 mN/m or less, and therefore even in the case described above, the ink deposited on the surface of the base material layer 1 can be effectively inhibited from being transferred to the surface of the sealant layer 4.

For ensuring that an ink deposited on the surface of the base material layer 1 is more effectively inhibited from being transferred to the surface of the sealant layer 4, the wet tension of the surface of the sealant layer 4 is preferably 20 mN/m or less.

The method for setting the wet tension of the surface of the sealant layer 4 to 25 mN/m or less, preferably 20 mN/m or less is not particularly limited, and examples thereof include a method in which a lubricant is caused to exist at the surface of the sealant layer 4.

As a method for causing a lubricant to exist at the surface of the sealant layer 4, for example, a method can be employed in which the surface of the sealant layer 4 of the battery packaging material is coated with a lubricant, or a lubricant is blended in a resin for forming the sealant layer 4, and bled out to the surface.

For setting the wet tension of the surface of the sealant layer 4 to 25 mN/m or less, preferably 20 mN/m or less, the total amount of lubricants existing in the sealant layer 4 and on a surface of the sealant layer 4 (battery element-side surface, i.e. a surface on a side opposite to the metal layer 3 side) is preferably about 200 to 1500 ppm.

The lubricant that is preferably caused to exist at the surface of the sealant layer 4 is preferably an amide-based lubricant, and examples of the amide-based lubricant include those shown as examples in the foregoing section [Base material layer 1].

In the present invention, the wet tension of the surface of the sealant layer 4 of the battery packaging material is a value obtained by performing measurement using a method conforming to JIS K6768:1999 as in the case of the base material layer 1.

[Adhesive Layer 5]

In the battery packaging materials according to the first aspect and the second aspect of the present invention, the adhesive layer 5 is a layer that is provided between the metal layer 3 and the sealant layer 4 as necessary for strongly bonding these layers to each other.

The adhesive layer 5 is formed from an adhesive capable of bonding the metal layer 3 and the sealant layer 4 to each other. The bonding mechanism, the kind of the adhesive agent component, and so on for the adhesive agent to be used for formation of the adhesive layer 5 are the same as those for the adhesive layer 2. The adhesive agent component to be used in the adhesive layer 5 is preferably a polyolefin-based resin, further preferably a carboxylic acid-modified polyolefin, especially preferably carboxylic acid-modified polypropylene.

The thickness of the adhesive layer 5 is, for example, 2 to 50 μm, preferably 15 to 30 μm.

[Coating Layer 6]

In the battery packaging material according to the second aspect of the present invention, a coating layer 6 may be provided on the base material layer 1 (on the base material layer 1 on a side opposite to the metal layer 3) for the purpose of for example, improving designability, electrolytic solution resistance, scratch resistance and moldability. The coating layer 6 is a layer that is situated at an outermost layer when a battery is assembled.

The coating layer 6 can be formed from, for example, polyvinylidene chloride, a polyester resin, a urethane resin, an acrylic resin, an epoxy resin, or the like. Preferably, the coating layer 6 is formed from a two-liquid curable resin among the resins described above. Examples of the two-liquid curable resin that forms the coating layer 6 include two-liquid curable urethane resins, two-liquid curable polyester resins and two-liquid curable epoxy resins. The coating layer 6 may contain a matting agent.

Examples of the matting agent include fine particles having a particle size of about 0.5 am to 5 μm. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, graphite, kaolin, montmorilloide, montmorillonite, synthetic mica, hydrotalcite, gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrenes, crosslinked polyethylenes, benzoguanamine, gold, aluminum, copper and nickel. These matting agents nay be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and dispersibility enhancing treatment.

The method for forming the coating layer 6 is not particularly limited, and examples thereof include a method in which a two-liquid curable resin for forming the coating layer 6 is applied to one of the surfaces of the base material layer 1. In the case where a matting agent is blended, the matting agent may be added to and mixed with the two-liquid curable resin, followed by applying the mixture.

While the thickness of the coating layer 6 is not particularly limited as long as a function as the coating layer 6 is performed, it is, for example, about 0.5 to 10 μm, preferably about 1 to 5 μm.

3. Method for Producing Battery Packaging Material

While the method for producing the battery packaging material of each of the first aspect and the second aspect of the present invention is not particularly limited as long as a laminate including layers each having predetermined composition is obtained, for example, the following method is shown as an example.

First, a laminate in which the base material layer 1, the adhesive layer 2 and the metal layer 3 are laminated in this order (hereinafter, the laminate may be described as a "laminate A") is formed. Specifically, the laminate A can be formed by a dry lamination method in which an adhesive agent to be used for formation of the adhesive layer 2 is applied onto the base material layer 1 or the metal layer 3 the surface of which is subjected to a chemical conversion treatment as necessary, using a coating method such as an extrusion method, a gravure coating method or a roll coating method, and dried, the metal layer 3 or the base material layer 1 is then laminated, and the adhesive layer 2 is cured.

Then, the sealant layer 4 is laminated on the metal layer 3 of the laminate A. When the sealant layer 4 is laminated directly on the metal layer 3, a resin component that forms the sealant layer 4 may be applied onto the metal layer 3 of the laminate A by a method such as a gravure coating method or a roll coating method. When the adhesive layer 5 is provided between the metal layer 3 and the sealant layer 4, mention is made of, for example, (1) a method in which the adhesive layer 5 and the sealant layer 4 are co-extruded to be laminated on the metal layer 3 of the laminate A (co-extrusion lamination method); (2) a method in which the adhesive layer 5 and the sealant layer 4 are laminated to form a laminate separately, and the laminate is laminated on the metal layer 3 of the laminate A by a thermal lamination method; (3) a method in which an adhesive for formation of the adhesive layer 5 is laminated on the metal layer 3 of the laminate A by an extrusion method or a method in which the adhesive is applied by solution coating, dried at a high temperature and baked, and the sealant layer 4 formed in a sheet shape beforehand is laminated on the adhesive layer 5 by a thermal lamination method; and (4) a method in which the melted adhesive layer 5 is poured between the metal layer 3 of the laminate A and the sealant layer 4 formed in a sheet shape beforehand, and simultaneously the laminate A and the sealant layer 4 are bonded together with the adhesive layer 5 interposed therebetween (sandwich lamination). The laminate may be further subjected to a heating treatment such as that of a heat roll contact type, hot air type or near- or far-infrared ray type, for enhancing the adhesion of the adhesive layer 2, and the adhesive layer 5 provided as necessary. As conditions for such a heating treatment, for example, the temperature is 150 to 250° C., and the time is 1 to 5 minutes. In the second aspect of the present invention, the coating layer 6 can be laminated on the base material layer 1 (on a side opposite to the metal layer 3). Lamination of the coating layer 6 may be performed either before or after lamination of the base material layer 1 and the metal layer 3.

In the battery packaging materials according to the first aspect and the second aspect of the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

Further, in the method for producing a battery packaging material according to the first aspect of the present invention, a corona treatment step of subjecting the surface of the base material layer 1 to a corona treatment to ensure that the wet tension of the surface of the base material layer 1 is 32 mN/m or more is carried out. The corona treatment is as described above. In the first aspect of the present invention, a base material layer having a surface wet tension of 32 mN/m or more is provided, and a lamination step of laminating at least the base material layer, a metal layer and a sealant layer to obtain a laminate is carried out, so that the battery packaging material according to the first aspect of the present invention can be produced without subjecting the laminate to a corona discharge treatment. As the base material layer having a surface wet tension of 32 mN/m or more, a commercial product can be used.

When printing is performed on a surface of the battery packaging material with an ink, the step of performing printing on at least a part of a surface of the base material layer 1 with an ink is carried out, the surface having a wet tension of 32 mN/m or more. The printing method is not particularly limited, but when printing is performed on the battery packaging material after molding, pad printing is preferred. In the battery packaging material obtained by the production method according to the first aspect of the present invention, the wet tension of the surface of the base material layer 1 is set to 32 mN/m or more, and therefore printing can be suitably performed on the battery packaging material with an ink even by pad printing that causes the ink to be easily repelled at the base material layer having a lubricant on a surface thereof. Therefore, for example, characters such as a bar code, a pattern and letters can be suitably formed on at least a part of the surface of the base material layer 1. The ink to be used in printing is as described above.

Further, in the method for producing a battery packaging material according to the second aspect of the present invention, a corona treatment step of subjecting the surface of the base material layer 1 to a corona treatment to ensure that the contact angle of the base material layer 1-side surface is 80° or less is carried out. The corona treatment is as described above. In the second aspect of the present invention, a base material layer having a surface contact angle of 80° or less is provided, and a lamination step of laminating at least the base material layer, a metal layer and a sealant layer to obtain a laminate is carried out, so that the battery packaging material according to the second aspect of the present invention can be produced without subjecting the laminate to a corona discharge treatment. As the base material layer having a surface contact angle of 80° or less, a commercial product can be used.

When printing is performed on a surface of the battery packaging material with an ink in the second aspect of the present invention, the step of performing printing on at least a part of a surface of the base material layer with an ink is carried out, the surface having a contact angle of 80° or less. The printing method is not particularly limited, but when printing is performed on the battery packaging material after molding, pad printing is preferred. In the battery packaging material obtained by the production method according to the second aspect of the present invention, the contact angle of the base material layer 1-side surface is set to 80° or less, and therefore printing can be suitably performed on the battery packaging material with an ink even by pad printing that causes the ink to be easily repelled at the base material layer having a lubricant on a surface thereof. Therefore, for example, characters such as a bar code, a pattern and letters can be suitably formed on at least a part of the surface of the base material layer 1. The ink to be used in printing is as described above.

4. Use of Battery Packaging Material

The battery packaging material according to the present invention (the first aspect and the second aspect of the present invention) is used as a packaging material for hermetically sealing and storing battery elements such as a positive electrode, a negative electrode and an electrolyte.

Specifically, a battery element including at least a positive electrode, a negative electrode and an electrolyte is covered with the battery packaging material according to the present invention such that a flange portion (region where a sealant layer is in contact with itself) can be formed on the periphery of the battery element while a metal terminal connected to each of the positive electrode and the negative electrode protrudes to the outside, and the sealant layer at the flange portion is heat-sealed with itself, thereby providing a battery using a battery packaging material. When the battery element is stored using the battery packaging material according to the present invention, the battery packaging material according to the present invention is used such that the sealant portion is on the inner side (surface that is in contact with the battery element).

In the battery according to the present invention, the battery packaging material according to the present invention is used, printing can be suitably performed on the surface of the battery with an ink after the battery packaging material is molded, and the battery element is sealed. In the battery according to the present invention, the wet tension of the surface of the base material layer is set to 32 mN/m or more, and therefore even by pad printing that causes the ink to be easily repelled at the base material layer having a lubricant on a surface thereof, printing can be suitably performed on the battery packaging material with an ink, so that characters such as, for example, a bar code, a pattern and letters can be suitably formed on at least a part of the surface of the battery.

The battery packaging material according to the present invention may be used for either a primary battery or a secondary battery, but is preferably used for a secondary battery. The type of secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the present invention is applied include lithium ion batteries and lithium ion polymer batteries.

EXAMPLES

The present invention will be described in detail below by showing examples and comparative examples. It is to be noted that the present invention is not limited to the examples.

Examples 1A to 8A and Comparative Examples 1A and 2A

<Production of Battery Packaging Material>

A battery packaging material including a laminate with a base material layer 1, an adhesive layer 2, a metal layer 3, an adhesive layer 5 and a sealant layer 4 laminated in this order was produced by laminating the adhesive layer 5 and the sealant layer 4 by a thermal lamination method to a laminate with the base material layer 1, the adhesive layer 2 and the metal layer 3 laminated in this order. Specific conditions for producing the battery packaging material are as shown below.

In each of Examples 1A to 8A and Comparative Examples 1A and 2A, as a resin film (thickness of 25 μm) for forming the base material layer 1, and the metal layer 2 (40 μm), those shown in Table 1 were used. The resin film for forming the base material layer 1 contains 1200 ppm of erucic acid amide. The aluminum foil was subjected to a chemical conversion treatment by applying to both the surfaces of the metal layer a treatment liquid including a phenol resin, a chromium fluoride compound (trivalent) and phosphoric acid using a roll coating method in such a manner that the application amount of chromium was 10 mg/m$^2$ (dry weight), and performing baking for 20 seconds under such conditions that the film temperature was 180° C. or higher.

First, a laminate with the base material layer 1, the adhesive layer 2 and the metal layer 3 laminated in this order was prepared. Specifically, the adhesive layer 2 composed of a two-liquid urethane adhesive agent including a polyester-based main agent and an isocyanate-based curing agent was formed in a thickness of 3 μm on one surface (corona-treated surface) of the base material layer 1, and dry-laminated to a chemically converted surface of the metal layer 3 to prepare a laminate with the base material layer 1, the adhesive layer 2 and the metal layer 3 laminated in this order.

Separately, as shown in Table 1A, an acid-modified polypropylene resin [unsaturated carboxylic acid-graft-modified random polypropylene graft-modified with an unsaturated carboxylic acid (acid-modified PP)] or an acid-modified polyethylene resin [unsaturated carboxylic acid graft-modified random polyethylene modified with an unsaturated carboxylic acid (acid-modified PE) for forming the adhesive layer 5, and polypropylene [random copolymer (PP)] or polyethylene (PE) for forming the sealant layer 4 were co-extruded to prepare a two-layer co-extruded film composed of the 23 μm-thick adhesive layer 5 and the 23 μm-thick sealant layer 4.

The prepared two-layer co-extruded film was then superimposed on the prepared laminate including the base material layer 1, the adhesive layer 2 and the metal layer 3 in such a manner that the adhesive layer 5 of the two-layer co-extruded film was in contact with the metal layer of the laminate, and thermal lamination was performed by applying heat so that the temperature of the metal layer 3 was 120° C., thereby obtaining a laminate with the base Material layer 1, the adhesive layer 2, the metal layer 3, the adhesive layer 5 and the sealant layer 4 laminated in this order. The obtained laminate was temporarily cooled, then heated to 180° C., and held at this temperature for 1 minute to be heat-treated, thereby obtaining a battery packaging material.

Further, the base material layer-side surface of each of the obtained battery packaging materials was subjected to a corona treatment under the following conditions to obtain the battery packaging material of each of Examples 1A to 8A and Comparative Examples 1A and 2A. In Table 1A, the PET/nylon for the base material layer means that the PET layer (12 μm) and the nylon layer (15 μm) are laminated in this order from the outermost surface side of the base material layer. In the sealant layer, the acid-modified PP/PP means that an acid-modified PP layer (23 μm) and a PP layer (23 μm) are laminated in this order from the metal layer side, and the acid-modified PE/PE means that an acid-modified PE layer (23 μm) and a PE layer (23 μm) are laminated in this order from the metal layer side.

[Corona Treatment]

Using a corona surface treatment device (trade name: CTW-0212) manufactured by WEDGE co., ltd, the surface of the base material layer 1 of the battery packaging material was irradiated with corona discharge at a constant rate of 10 MT/min with the set value of each power (Kw) as shown in Table 1.

[Method for Evaluation of Ink Printing Characteristic]

Pad-printing was performed on the surface of the base material layer of the battery packaging material of each of Examples 1A to 8A and Comparative Examples 1A and 2A, and the ink printing characteristic was evaluated. As a pad printer, SPACE PAD 6GX manufactured by MISHIMA CO., LTD. was used. As an ink, UV INK PJU-A Black manufactured by Navitas Co., Ltd. was used. The ink deposited on the surface of the base material layer was cured by irradiating the ink with UV light with an ultraviolet-ray wavelength of 254 nm for 30 seconds at a distance of 10 cm using Handy UV Lamp SUV-4 manufactured by AS ONE Corporation. The printed surface after curing was observed with an optical microscope, and the ink printing characteristic was evaluated in accordance with the following criteria. The printing with ink was performed under an environment at a temperature of 24° C. and a relative humidity of 50%. The results are shown in Table 1A.
◯: The print missing part constitutes 5% or less of the whole printed pattern.
∇: The print missing part constitutes more than 5% and 10% or less of the whole printed pattern.
x: The print missing part constitutes more than 10% of the whole printed pattern.

<Measurement of Wet Tension>

The wet tension of the surface of the base material layer of the battery packaging material of each of Examples 1A to 8A and Comparative Examples 1A and 2A was measured using a method conforming to JIS K6768:1999. For the purpose of comparison and evaluation of printability, evaluation of the mN/m value of the surface of the base material layer of the battery packaging material was performed using a wetting reagent conforming to JIS K6768:1999. A wet tension testing mixed liquid manufactured by NACALAI TESQUE, INC. was impregnated into a spherical absorbent cotton, and linearly applied over a distance of about 5 cm to the surface of the base material layer of each battery packaging material, whether or not the liquid film was broken was visually checked after 2 seconds, and the mN/m value at which the liquid film was not broken was defined as a wet tension of the base material. The measurement of the wet tension was performed under an environment at a temperature of 24° C. and a relative humidity of 50%. The results are shown in Table 1A.

istic. On the other hand, in each of Comparative Examples 1A and 2A where the surface of the base material layer was not subjected to a corona treatment, the wet tension of the surface of the base material layer was less than 32 mN/m, and thus the battery packaging material had a poor ink printing characteristic. Each of the battery packaging materials had favorable moldability.

In production of the battery packaging material of each of Examples 1A to 8A and Comparative Examples 1A and 2A, the base material layer was subjected to the corona discharge treatment beforehand so that as the wet tension of the surface of the base material layer, a value as shown in Table 1A was obtained, and a battery packaging material with the base material layer 1, the adhesive layer 2, the metal layer 3, the adhesive layer 5 and the sealant layer 4 laminated in this order as in the case of Examples 1A to 8A and Comparative Examples 1A and 2A was prepared. In these battery packaging materials, the laminate was not subjected to a corona discharge treatment. Also in these battery packaging materials, the same results as in Examples 1A to 8A and Comparative Examples 1A and 2A were obtained for the ink printing characteristic and the moldability.

Examples 9A-12A

<Production of Battery Packaging Material>

A battery packaging material was produced in the same manner as in Example 1A except that a lubricant (erucic acid amide) was blended in the sealant layer in an amount as described in Table 2A. The surface of the base material layer 1 of the obtained battery packaging material was subjected to a corona treatment in the same manner as in [Corona treatment] in Example 1A.

[Measurement of Wet Tension]

The wet tension of each of the surface of the base material layer and the surface of the sealant layer of the battery packaging material obtained in each of Examples 9A to 12A was measured by the same method as in [Measurement of wet tension] of the surface of the base material layer in Example 1A. The results are shown in Table 2A.

(Evaluation of Ink Transfer Characteristic)

Printing was performed on the surface of the base material layer of the battery packaging material obtained in each of Examples 9A to 12A with an ink (the area of a part on which the ink was deposited is 210 mm$^2$) in the same manner as in [Method for evaluation of ink printing characteristic], and the battery packaging material was wound. Here, in the wound body, the sealant layer was situated on the inner side, and the surface of the base material layer and the surface of

TABLE 1A

| | Base material layer | Metal layer | Sealant layer | Corona treatment (power value) | Ink printing characteristic | Wet tension (mN/m) |
|---|---|---|---|---|---|---|
| Example 1A | Nylon | Aluminum alloy | Acid-modified PP/PP | 1 Kw | ◯ | 35 |
| Example 2A | Nylon | Aluminum alloy | Acid-modified PE/PE | 1 Kw | ◯ | 37 |
| Example 3A | PBT | Aluminum alloy | Acid-modified PP/PP | 2 Kw | ◯ | 39 |
| Example 4A | PET | Stainless steel | Acid-modified PP/PP | 1 Kw | ◯ | 35 |
| Example 5A | Nylon | Aluminum alloy | Acid-modified PP/PP | 1 Kw | ◯ | 36 |
| Example 6A | PET/Nylon | Aluminum alloy | Acid-modified PP/PP | 1 Kw | ◯ | 37 |
| Example 7A | Nylon | Aluminum alloy | Acid-modified PP/PP | 0.5 Kw | ∆ | 34 |
| Example 8A | PET/Nylon | Aluminum alloy | Acid-modified PP/PP | 0.3 Kw | ∆ | 33 |
| Comparative Example 1A | Nylon | Aluminum alloy | Acid-modified PP/PP | None | x | 30 |
| Comparative Example 2A | PET/Nylon | Aluminum alloy | Acid-modified PP/PP | None | x | 31 |

In each of Examples 1A to 8A where the surface of the base material layer was subjected to a corona treatment, the wet tension of the surface of the base material layer was 32 mN/m or more as shown in Table 1A, and thus the battery packaging material had an excellent ink printing characterthe sealant layer were in contact with each other. The length of the wound battery packaging material was 200 m, and the wound body was in the form of a cylinder in which the diameter of circle cross-section was 300 cm. Next, the obtained wound body was unwound, and whether or not the ink deposited on the surface of the base material layer was transferred to the surface of the sealant layer was visually checked. Samples in which no ink was transferred to the sealant layer were rated ○, and samples in which the ink was transferred to the sealant layer even in the slightest degree were rated x. The results are shown in Table 2A.

(Evaluation of Moldability)

The battery packaging material obtained in each of Examples 9A to 12A was cut to a rectangle of 80×120 mm to prepare a sample. Using a mold (female mold) having an opening size of 30×50 mm and a corresponding mold (male mold), the sample was cold-molded while the molding depth was changed by units of 0.5 mm from the molding depth of 0.5 mm under a pressing force of 0.4 MPa. This procedure was carried out for 10 samples at each depth. For the sample after the cold molding, the deepest of depths at which none of the 10 samples had creases, and pinholes and cracks in the aluminum foil was defined as the limit molding depth of the sample. From the limit molding depth, the moldability of the battery packaging material was evaluated in accordance with the following criteria. The results are shown in Table 2A.
○: The limit molding depth is 6.0 mm or more.
∇: The limit molding depth is 4.0 mm to 5.5 mm.
x: The limit molding depth is 3.5 mm or less.

TABLE 2A

| | Amount of lubricant (ppm) | Wet tension of surface of base material layer (mN/m) | Wet tension of surface of sealant layer (mN/m) | Ink transfer characteristic | Moldability |
|---|---|---|---|---|---|
| Example 9A | 200 | 35 | 10 | ○ | ○ |
| Example 10A | 1500 | 35 | 25 | ○ | ○ |
| Example 11A | 0 | 35 | 5 | ○ | x |
| Example 12A | 1700 | 35 | 30 | x | ○ |

In production of the battery packaging material of each of Examples 9A to 12A, the base material layer was subjected to the corona discharge treatment beforehand so that as the wet tension of the surface of the base material layer, a value as shown in Table 2A was obtained, and a battery packaging material with the base material layer 1, the adhesive layer 2, the metal layer 3, the adhesive layer 5 and the sealant layer 4 laminated in this order as in the case of Examples 9A to 12A was prepared. These battery packaging materials were not subjected to a corona discharge treatment after lamination. Also in these battery packaging materials, the same results as in Examples 9A to 12A were obtained for the ink printing characteristic and the moldability.

Examples 1B to 6B and Comparative Examples 1B and 2B

<Production of Battery Packaging Material>

A battery packaging material including a laminate with a base material layer 1, an adhesive layer 2, a metal layer 3, an adhesive layer 5 and a sealant layer 4 laminated in this order was produced by laminating the adhesive layer 5 and the sealant layer 4 by a co-extrusion method to a laminate with the base material layer 1, the adhesive layer 2 and the metal layer 3 laminated in this order. Specific conditions for producing the battery packaging material are as shown below.

In each of Examples 1B to 6B and Comparative Examples 1B and 2B, as a resin film (thickness of 25 μm) for forming the base material layer 1, and the metal layer 2 (40 μm), those shown in Table 1B were used. The resin film for forming the base material layer 1 contains 1200 ppm of erucic acid amide. The aluminum foil was subjected to a chemical conversion treatment by applying to both the surfaces of the metal layer a treatment liquid including a phenol resin, a chromium fluoride compound (trivalent) and phosphoric acid using a roll coating method in such a manner that the application amount of chromium was 10 mg/m$^2$ (dry weight), and performing baking for 20 seconds under such conditions that the temperature was 180° C. or higher.

First, a laminate with the base material layer 1, the adhesive layer 2 and the metal layer 3 laminated in this order was prepared. Specifically, the adhesive layer 2 composed of a two-liquid urethane adhesive agent including a polyester-based main agent and an isocyanate-based curing agent was formed in a thickness of 3 μm on one surface (corona-treated surface) of the base material layer 1, and laminated to a the metal layer 3 by a dry lamination method to prepare a laminate with the base material layer 1, the adhesive layer 2 and the metal layer 3 laminated in this order.

Next, an acid-modified polypropylene resin [unsaturated carboxylic acid-graft-modified random polypropylene graft-modified with an unsaturated carboxylic acid (acid-modified PP)] for forming the adhesive layer 5 and polypropylene [random copolymer (PP)] for forming the sealant layer 4 were melted, and co-extruded to the surface of the metal layer 3 of the laminate to laminate 23 μm-thick adhesive layer 5 and the 23 μm-thick sealant layer 4. In this way, a laminate with the base material layer 1, the adhesive layer 2, the metal layer 3, the adhesive layer 5 and the sealant layer 4 laminated in this order was obtained. The obtained laminate was temporarily cooled, then heated to 180° C., and held at this temperature for 1 minute to be heat-treated, thereby obtaining a battery packaging material.

In examples 5B and 6B, the coating layer 6 was provided on the surface of the base material layer 1 in the following manner.

(Mat Coating)

In Example 5B, printing was performed on the surface of the base material layer of the battery packaging material obtained as described above by gravure coating with an ink obtained by mixing a resin (80% by mass) composed of a polyester polyol and an isocyanate-based curing agent, and silica particles (20% by mass), so that a 3 μm-thick mat coating layer was formed.

(Black Mat Coating)

In Example 6B, printing was performed on the surface of the base material layer of the battery packaging material obtained as described above by gravure coating with an ink obtained by mixing a resin (70% by mass) composed of a polyester polyol and an isocyanate-based curing agent, carbon black (15% by mass), and silica particles (15% by mass), so that a 6 μm-thick black mat coating layer was formed.

Further, the base material layer-side surface of each of the obtained battery packaging materials was subjected to a corona treatment under the following conditions to obtain the battery packaging material of each of Examples 1B to 6B and Comparative Examples 1B and 2B. In Table 1B, the PET/nylon for the base material layer means that the PET layer (12 μm) and the nylon layer (15 μm) are laminated in this order from the outermost surface side of the base material layer. The mat coating/nylon means that a mat coating layer 6 is provided on the nylon for forming the base material layer 1, and the same applies to the black mat coating.

[Corona Treatment]

Using a corona surface treatment device (trade name: CTW-0212) manufactured by WEDGE co., ltd, the base material layer 1-side surface of the battery packaging material was irradiated with corona discharge at a constant rate of 10 MT/min with the set value of each power (Kw) as shown in Table 1B.

[Method for Evaluation of Ink Printing Characteristic]

Pad-printing was performed on the base material layer-side surface of the battery packaging material of each of Examples 1B to 6B and Comparative Examples 1B and 2B, and the ink printing characteristic was evaluated. As a pad printer, SPACE PAD 6GX manufactured by MISHIMA CO., LTD. was used. As an ink, UV INK PJU-A Black manufactured by Navitas Co., Ltd. was used. The ink deposited on the base material layer-side surface was cured by irradiating the ink with UV light with an ultraviolet-ray wavelength of 254 nm for 30 seconds at a distance of 10 cm using Handy UV Lamp SUV-4 manufactured by AS ONE Corporation. The printed surface after curing was observed with an optical microscope, and the ink printing characteristic was evaluated in accordance with the following criteria. The printing with ink was performed under an environment at a temperature of 24° C. and a relative humidity of 50%. The results are shown in Table 1B.

○: The print missing part constitutes 5% or less of the whole printed pattern.

x: The print missing part constitutes more than 5% of the whole printed pattern.

<Measurement of Contact Angle>

The contact angle of the base material layer-side surface of the battery packaging material of each of Examples 1B to 6B and Comparative Examples 1B and 2B was measured in the following manner: the contact angle at the interface between a base material and a water droplet 5 seconds after dropping of water was measured by using LSE-A210 manufactured by NiCK Corporation. The results are shown in Table 1B.

TABLE 1B

| | Base material layer | Corona treatment (power value) | Ink printing characteristic | Contact angle (°) |
|---|---|---|---|---|
| Example 1B | Nylon | 1 Kw | ○ | 78 |
| Example 2B | PET/Nylon | 1 Kw | ○ | 79 |
| Example 3B | Nylon | 2 Kw | ○ | 72 |
| Example 4B | PBT | 3 Kw | ○ | 78 |
| Example 5B | Mat coating/Nylon | — | ○ | 71 |
| Example 6B | Black mat coating/Nylon | — | ○ | 72 |
| Comparative Example 1B | Nylon | — | x | 84 |
| Comparative Example 2B | PET/Nylon | — | x | 85 |

In Table 1B, PET represents polyethylene terephthalate, and PBT represents polybutylene terephthalate.

In production of the battery packaging material of each of Examples 1B to 6B and Comparative Examples 1B and 2B, the base material layer (coating layer in Examples 5B and 6B) was subjected to the corona discharge treatment beforehand so that as the contact angle of the surface of the base material layer, a value as shown in Table 1B was obtained, and a battery packaging material with the base material layer 1, the adhesive layer 2, the metal layer 3, the adhesive layer 5 and the sealant layer 4 laminated in this order as in the case of Examples 1B to 6B and Comparative Examples 1B and 2B was prepared. In these battery packaging materials, the laminate was not subjected to a corona discharge treatment. Also in these battery packaging materials, the same results as in Examples 1B to 6B and Comparative Examples 1B and 2B were obtained for the ink printing characteristic.

DESCRIPTION OF REFERENCE SIGNS

1: Base material layer
2: Adhesive layer
3: Metal layer
4: Sealant layer
5: Adhesive layer
6: Coating layer

The invention claimed is:

1. A battery packaging material comprising a laminate including at least a base material layer, a metal layer and a sealant layer laminated in this order, wherein:
    a surface of the base material layer has a wet tension of 32 mN/m or more,
    a surface of the sealant layer has a wet tension of 25 mN/m or less, and
    a total amount of lubricant existing in the sealant layer and on the surface of the sealant layer is about 200 to 1500 ppm.

2. The battery packaging material according to claim 1, which is used in a state in which printing is performed on a part of the surface of the base material layer with an ink.

3. The battery packaging material according to claim 1, wherein printing is performed on at least a part of the surface of the base material layer with an ink.

4. The battery packaging material according to claim 1, wherein the surface of the base material layer is subjected to a corona treatment.

5. The battery packaging material according to claim 1, wherein the lubricant exists on the surface of the sealant layer.

6. The battery packaging material according to claim 1, wherein an adhesive layer is laminated between the base material layer and the metal layer.

7. The battery packaging material according to claim 1, wherein an adhesive layer is laminated between the metal layer and the sealant layer.

8. The battery packaging material according to claim 1, wherein the metal layer is formed of an aluminum foil.

9. The battery packaging material according to claim 1, wherein a lubricant exists on the surface of the base material layer.

10. A battery comprising a battery element including at least a positive electrode, a negative electrode and an electrolyte, the battery element being stored in the battery packaging material according to claim 1.

11. A method for producing the battery packaging material of claim 1, the method comprising:
    laminating at least the base material layer, the metal layer and the sealant layer to obtain the laminate.

12. The method according to claim 11, further comprising:
    performing printing with an ink on at least a part of the surface of the base material layer having a wet tension of 32 mN/m or more.

13. A battery packaging material comprising a laminate including at least a base material layer, a metal layer and a sealant layer laminated in this order, wherein:
- a base material layer-side surface has a contact angle of 80° or less,
- a surface of the sealant layer has a wet tension of 25 mN/m or less, and
- a total amount of lubricant existing in the sealant layer and on the surface of the sealant layer is about 200 to 1500 ppm.

14. The battery packaging material according to claim 13, which is used in a state in which printing is performed on a part of the base material layer-side surface with an ink.

15. The battery packaging material according to claim 13, wherein printing is performed on at least a part of the base material layer-side surface with an ink.

16. The battery packaging material according to claim 13, wherein the base material layer-side surface is subjected to a corona treatment.

17. The battery packaging material according to claim 13, wherein the lubricant exists on the surface of the sealant layer.

18. The battery packaging material according to claim 13, wherein a lubricant exists on the base material layer-side surface.

19. A method for producing the battery packaging material of claim 13, the method comprising:
- laminating at least the base material layer, the metal layer and the sealant layer to obtain the laminate.

20. The method according to claim 19, further comprising:
- performing printing with an ink on at least a part of the base material layer-side surface having a contact angle of 80° or less.

* * * * *